United States Patent [19]
Kath

[11] Patent Number: 5,927,599
[45] Date of Patent: Jul. 27, 1999

[54] WIRELESS AIR CONDITIONING CONTROL SYSTEM

[75] Inventor: Miles E. Kath, Hampstead, N.C.

[73] Assignee: Marley Electric Heating, Bennettsville, S.C.

[21] Appl. No.: 08/816,458

[22] Filed: Mar. 12, 1997

[51] Int. Cl.⁶ .......................... G05D 23/00; F28F 27/00
[52] U.S. Cl. ........................ 236/47; 236/51; 165/205
[58] Field of Search ............................ 236/51, 47, 46 R; 165/205–230

[56] References Cited

U.S. PATENT DOCUMENTS

| | | |
|---|---|---|
| 2,346,889 | 4/1944 | Wullschleger . |
| 3,286,126 | 11/1966 | Crawford . |
| 3,746,939 | 7/1973 | Taketa et al. . |
| 4,037,141 | 7/1977 | Fichtner . |
| 4,132,355 | 1/1979 | Cleary et al. . |
| 4,150,415 | 4/1979 | Fichtner . |
| 4,172,555 | 10/1979 | Levine ................................. 236/46 R |
| 4,811,897 | 3/1989 | Kobayashi et al. . |
| 4,824,012 | 4/1989 | Tate . |
| 4,860,950 | 8/1989 | Reeser et al. . |
| 5,100,053 | 3/1992 | Manson et al. ........................ 236/47 |
| 5,104,037 | 4/1992 | Karg et al. . |
| 5,135,045 | 8/1992 | Moon . |
| 5,197,668 | 3/1993 | Ratz et al. . |
| 5,224,648 | 7/1993 | Simon, et al. . |
| 5,271,558 | 12/1993 | Hampton . |
| 5,272,477 | 12/1993 | Tashima et al. . |
| 5,361,985 | 11/1994 | Rein et al. ............................ 236/51 X |
| 5,364,304 | 11/1994 | Hampton ............................. 236/51 X |
| 5,458,123 | 10/1995 | Unger ..................................... 128/696 |
| 5,505,377 | 4/1996 | Weiss . |
| 5,711,480 | 1/1998 | Zepke et al. ............................. 236/51 |

OTHER PUBLICATIONS

Berko, Quality electric Heating Products, Nov., 1995, printed in U.S.A.

Photographs of device exhibited at tradeshow on Feb. 4, 1994, pp. 1–5.

*Primary Examiner*—William Wayner
*Attorney, Agent, or Firm*—Dority & Manning, P.A.

[57] ABSTRACT

A wireless air conditioning control system is provided. A thermostat assembly measures ambient temperature in an area to which an air conditioning system provides conditioned air. It compares the measured ambient temperature with a predetermined target temperature and wirelessly transmits air conditioning request signals to an air conditioning control assembly responsively to the comparison. The thermostat assembly and the air conditioning control assembly may be automatically mated with one another so that the air conditioning control assembly responds to air conditioning request signals only from a particular thermostat assembly. Where a plurality of transmitters are present, their transmissions are staggered to avoid data collision. The control assembly includes a freeze protection mechanism to protect against freezing conditions in the absence of air conditioning request signals. A battery powered thermostat assembly is intermittently partially shut down to reduce power consumption. The transmitter assembly predicts temperature to account for thermal inertia.

27 Claims, 5 Drawing Sheets

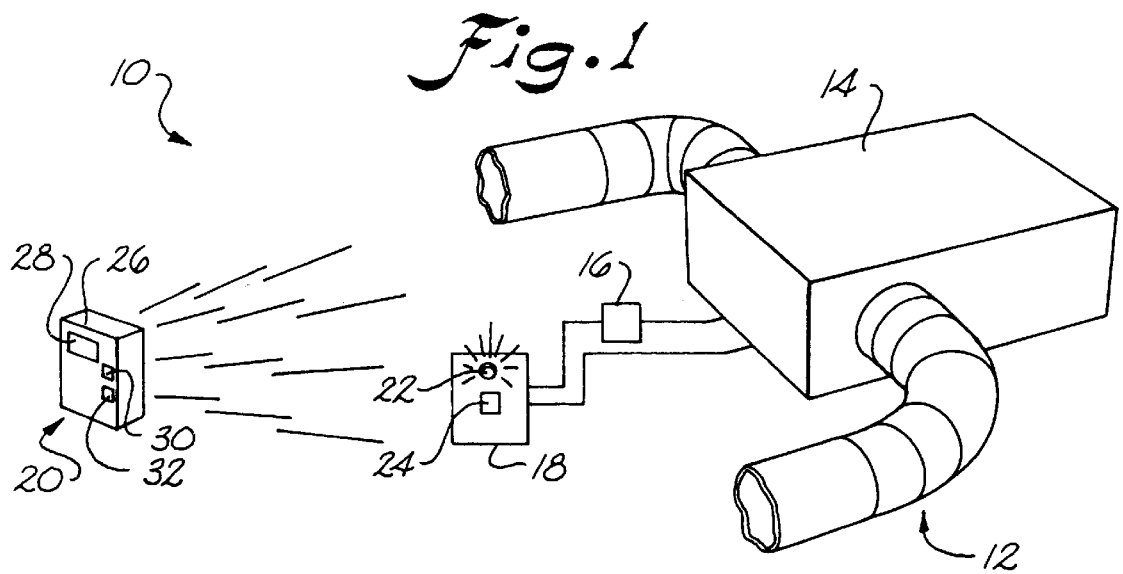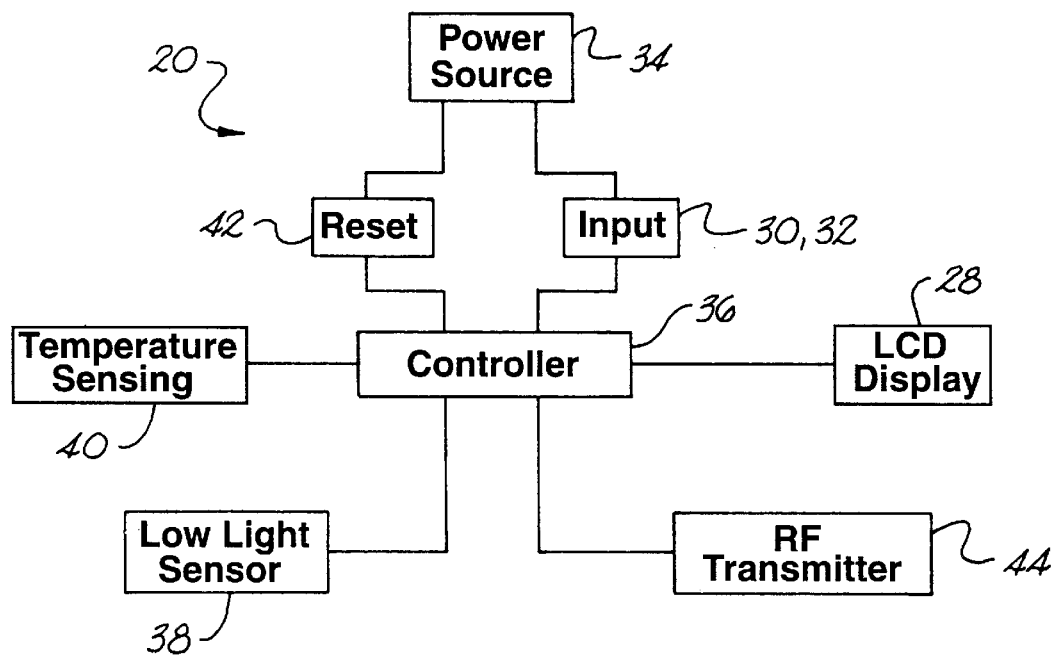

WIRELESS AIR CONDITIONING CONTROL SYSTEM

BACKGROUND OF THE INVENTION

The present invention relates to a wireless air conditioning control system.

Conventional wall-mounted thermostat control systems typically include a thermostat mounted in a building area to which an air conditioning system provides conditioned air, either heated or cooled. The thermostat typically measures ambient temperature and compares the ambient temperature to a desired temperature set by an operator. Generally, thermostats may be set in either a heating mode, a cooling mode, or a combination mode with a gap provided between the cooling set point and the heating set point.

In a heating configuration, for example, the thermostat measures the ambient temperature and activates the air conditioning system (in this case a heater or furnace) when the measured ambient temperature falls below the set point to provide heated air to the area. The thermostat continues to monitor the ambient temperature and turns the air conditioning system off when the set point, or a predetermined temperature above the set point, is achieved. The predetermined temperature above the set point is known as the deadband.

Various types of thermostats are known. For example, bimetallic thermostats measure ambient temperature by monitoring bymetallic strips which deform with temperature change. Such thermostats typically cycle on and off at best one or two times per hour. Such low cycling rates may cause thermal stratification, creating cool areas near the floor and warm areas near the ceiling.

Thermostats may be connected in line with the electric current lines driving the air conditioning system. If such a thermostat is inadequately insulated, heat may build up from the current-carrying wires. This may cause inaccurate temperature readings by the thermostat and, consequently, inaccurate control of the air conditioning system.

Thermal inertia is another difficulty encountered with air conditioning systems. In a heating system, for example, heat may continue to dissipate from a heater after the thermostat turns the heater off, causing the temperature in the area to undesirably rise above the set point or the deadband. Heat-anticipated thermostats typically use a small heat source within the thermostat to cause the thermostat to turn the heater off before the ambient temperature reaches the set point or the deadband temperature above the set point. Thermal inertia may then carry the ambient temperature to a desired point.

Traditional wall-mounted thermostats are placed in areas that are served by the air conditioning system. Thus, the device that measures ambient temperature and that controls the air conditioning system is remotely located from the air conditioning system. Typically, wiring is run through the wall to the thermostat and between the thermostat and the air conditioning system to provide power to the thermostat and to carry control signals to the air conditioning system. This increases the difficulty in installing thermostats and in moving thermostats following installation.

SUMMARY OF THE INVENTION

The present invention recognizes and addresses the foregoing disadvantages, and others of prior art constructions and methods.

Accordingly, it is an object of the present invention to provide an improved wireless air conditioning control system.

It is also an object of the present invention to provide a portable remote wireless thermostat assembly which measures ambient temperature and transmits air conditioning control signals to an air conditioning control assembly which controls an air conditioning system.

It is a further object of the present invention to provide a wireless air conditioning control system having a thermostat assembly which automatically mates with an air conditioning control assembly which controls operation of an air conditioning system.

It is a still further object of the present invention to provide a wireless air conditioning control system, including a thermostat assembly which wirelessly transmits air conditioning request signals to an air conditioning control assembly, which avoids data collision during the transmissions.

It is yet another object of the present invention to provide a wireless air conditioning control system including a freeze protection mechanism which provides heated air from an air conditioning system when the ambient temperature drops below a predetermined minimum level.

It is a still further object of the present invention to provide a wireless air conditioning control system, including a thermostat assembly which conserves power drawn from an electricity source.

It is another object of the present invention to provide a wireless air conditioning control system including a thermostat assembly configured to predict ambient temperature in order to account for the effects of thermal inertia.

Some of these objects are achieved by a wireless air conditioning control system comprising a thermostat assembly configured to measure ambient temperature in an area to which an air conditioning system provides conditioned air, to compare ambient temperature with a predetermined target temperature, to wirelessly transmit identification signals, and to wirelessly transmit air conditioning request signals responsively to the comparison between the measured temperature and the target temperature. The air conditioning request signals and the identifying signals correspond to a particular thermostat assembly for use in the area.

An air conditioning control assembly is configured to receive the air conditioning request signals and to control operation of the air conditioning system responsively to the air conditioning request signals. The air conditioning control assembly is also configured to receive an identifying signal from the thermostat assembly and to thereafter control operation of the air conditioning system responsively to the air conditioning request signals received only from the thermostat assembly identified by the identifying signals.

In a preferred embodiment, the thermostat assembly (hereinafter referred to as "thermostat") is a portable unit contained in a housing which may be temporarily or permanently mounted to a surface such as a wall. The air conditioning control assembly (hereinafter referred to as "receiver") is located proximate the air conditioning system. Once the air conditioning system is installed, the thermostat may be mounted in a desired location, or moved from an existing location, without installing or redirecting electrical wiring to and from the thermostat and without creating or repairing mounting holes in the wall.

Preferably, the receiver is configured to recognize air conditioning request signals from only one thermostat. The thermostat transmits air conditioning request signals that include, at least in part, a serial number unique to that thermostat among any thermostats in use around that receiver. Thus, the receiver recognizes request signals from its corresponding thermostat by the serial number and operates its corresponding air conditioning system responsive only to those request signals.

Upon installation, a thermostat and receiver pair may be automatically mated to one another. Upon operator command, the thermostat transmits identifying signals that include its serial number. Upon receipt of one or more of these identifying signals, the receiver stores the thermostat's serial number and thereafter responds to request signals only from that particular thermostat. While it is preferable that there be a one-to-one correspondence between a thermostat and a receiver, it is possible that a plurality of receivers could respond to a single thermostat or that a single receiver could respond to a plurality of thermostats.

The ability of the receiver to automatically mate with a thermostat avoids inefficiency and error that might occur if an operator manually mates the devices, for example by inputting the thermostat serial number to the receiver by triggering appropriate dip switches.

If multiple thermostats are used close enough together that their transmissions may interfere, data collisions may occur which would prevent proper operation of the air conditioning system or systems. To avoid this, one preferably constructed thermostat automatically staggers its transmissions from those of other similar thermostats.

These thermostats measure ambient temperature and transmit air conditioning request signals as needed until the ambient temperature reaches a desired level. During this time, the request signals are transmitted periodically, the interval being approximately once per minute. The transmission interval for each thermostat, however, differs slightly from one minute. The actual length is determined by the serial number of the thermostat. The length will be slightly longer, or slightly shorter, than one minute but will be unique among the thermostats if each thermostat has a unique serial number. Thus, by setting each thermostat to a different serial number, data collisions are avoided.

The thermostat will typically be provided with its own power source, for example a battery, and will typically be located remotely from the receiver. At some time, for example damage or loss of power, the thermostat might not be present or might be inoperative when the receiver is still in operative control of the air conditioning system. Under such conditions, the area served by the air conditioning system could drop to undesirably cold temperatures in cold weather. To avoid this, a freeze protection configuration is provided in a preferred embodiment. The receiver includes its own temperature sensing mechanism which measures ambient temperature. This temperature is compared to a predetermined minimum desired temperature, for example 40° F. If the ambient temperature ever falls below this minimum temperature, the receiver activates the air conditioning system to provide heated air to the area. Accordingly, the air conditioning control system maintains at least a minimum ambient temperature to prevent freezing, even in the absence of an operative thermostat.

In a preferred embodiment, the thermostat is powered by batteries stored within a thermostat housing. To maximize battery life, one preferred embodiment of the present invention intermittently reduces electric current drawn from the batteries. For example, normal current in this embodiment may be approximately 30 microamps. A microprocessor in the thermostat reduces this current in a sleep mode to 0.03 microamps. The thermostat "wakes up" three times per second to maintain an LCD display and to determine if any other functions need be performed. For example, if it is time to measure the ambient temperature, the thermostat remains "awake" approximately 150 milliseconds to perform the measurement. In such a system, under normal use, three 1.5 volt AAA batteries may be expected to operate satisfactorily for two to three years.

As described above, thermal inertia may cause an undesirable overshoot in ambient temperature when the air conditioning system stops. In a preferred embodiment of the present invention, the thermostat performs a heat anticipation algorithm to predict ambient temperature a short time in the future and stops the air conditioning system an appropriate time before the ambient temperature reaches the desired set temperature.

The accompanying drawings, which are incorporated and constitute a part of this specification, illustrate preferred embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 1 is a diagrammatic illustration of a wireless air conditioning control system constructed in accordance with the present invention;

FIG. 2 is a diagrammatic illustration of a thermostat assembly constructed in accordance with the present invention;

Figure 3:
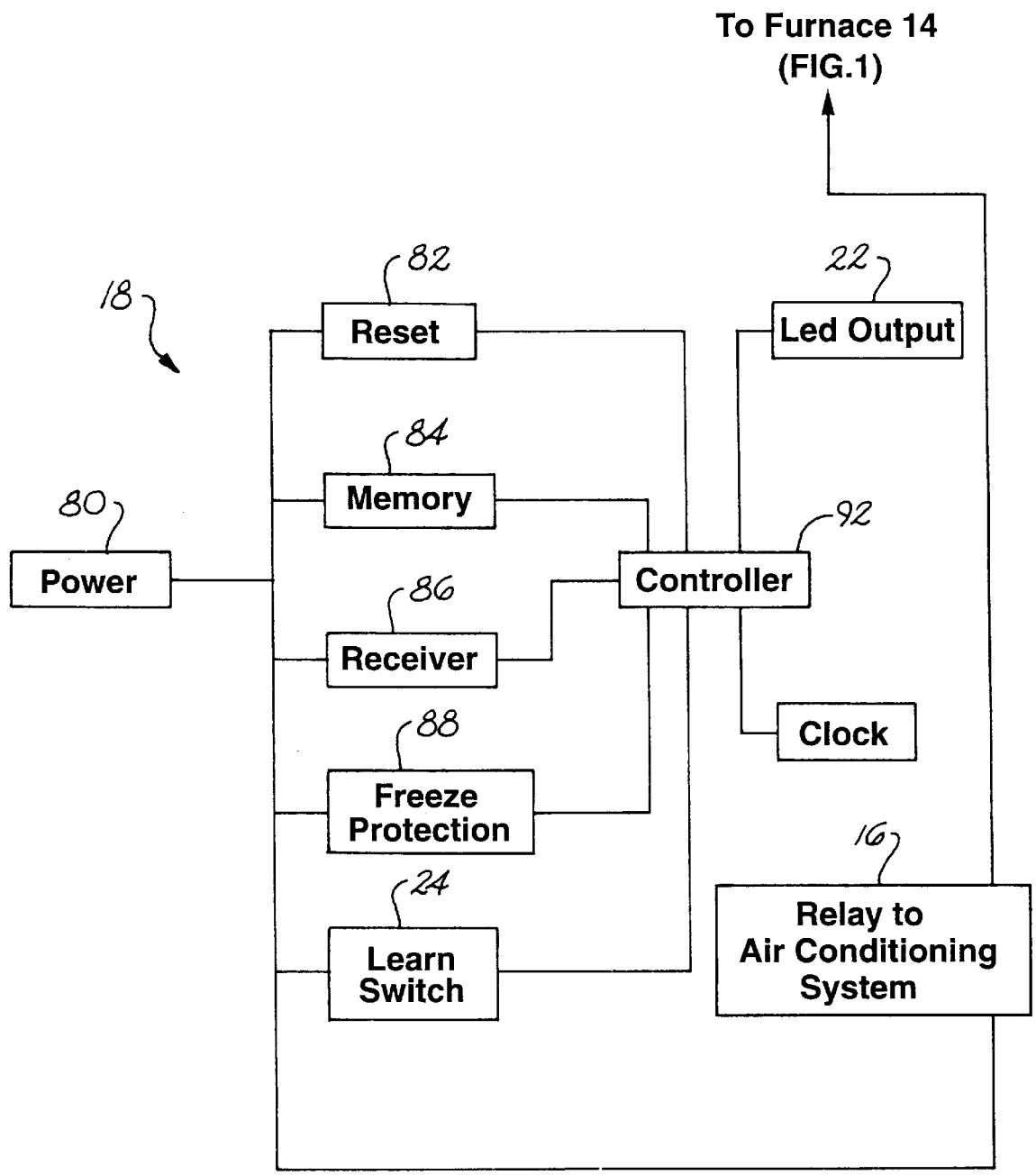
FIG. 3 is a diagrammatic illustration of an air conditioning control assembly constructed in accordance with the present invention.

Repeat use of reference characters in the present specification and drawings is intended to represent same or analogous features or elements of the invention.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention provides a wireless air conditioning control system. Accordingly, an air conditioning control system 10 includes an air conditioning system 12 having a furnace 14 activated by a relay 16. It should be understood by those of ordinary skill in this art that air conditioning systems may include various types and configurations of heating and cooling systems. Furthermore, an air conditioning system may be a single integrated unit or, for example, may encompass a plurality of air conditioning units dedicated to specific areas served by individual thermostats. For ease of explanation, however, the present invention will be hereinafter described in the context of a heating system having a single furnace unit. This is not intended to limit the present invention, which may employ various suitable air conditioning systems.

System 10 includes an air conditioning control assembly, hereinafter referred to as "receiver," 18 and a thermostat assembly, hereinafter referred to as "transmitter," 20. Receiver 18 includes an indicator light 22 and learn switch 24, the operation of which is described below.

Transmitter 20 is a portable unit contained within a housing 26, which may be temporarily or permanently mounted to a wall or other appropriate surface. Transmitter 20 includes a display 28 and input buttons 30 and 32, the operation of which is described below.

FIG. 2 provides a block diagram illustration of various components of transmitter 20. Transmitter 20 is a self-contained unit powered by a battery 34 and including a controller 36. Controller 36 preferably comprises an integrated circuit device such as a microprocessor, for example as manufactured by Microchip Technologies, Inc. of Chandler, Ariz., that includes a processor and non-volatile memory. Transmitter 20 also includes other non-volatile memory, such as a 24LC01 serial EEPROM device that stores a serial number unique for the particular transmitter 20. Inputs to controller 36 include a low light sensor 38, a low-volt sensor (not shown), a temperature sensing mechanism 40, and input buttons 30 and 32. Battery power is provided to controller 36 through a master reset switch 42. Controller 36 transmits air conditioning control signals via an RF transmitter 44.

Figure 4:
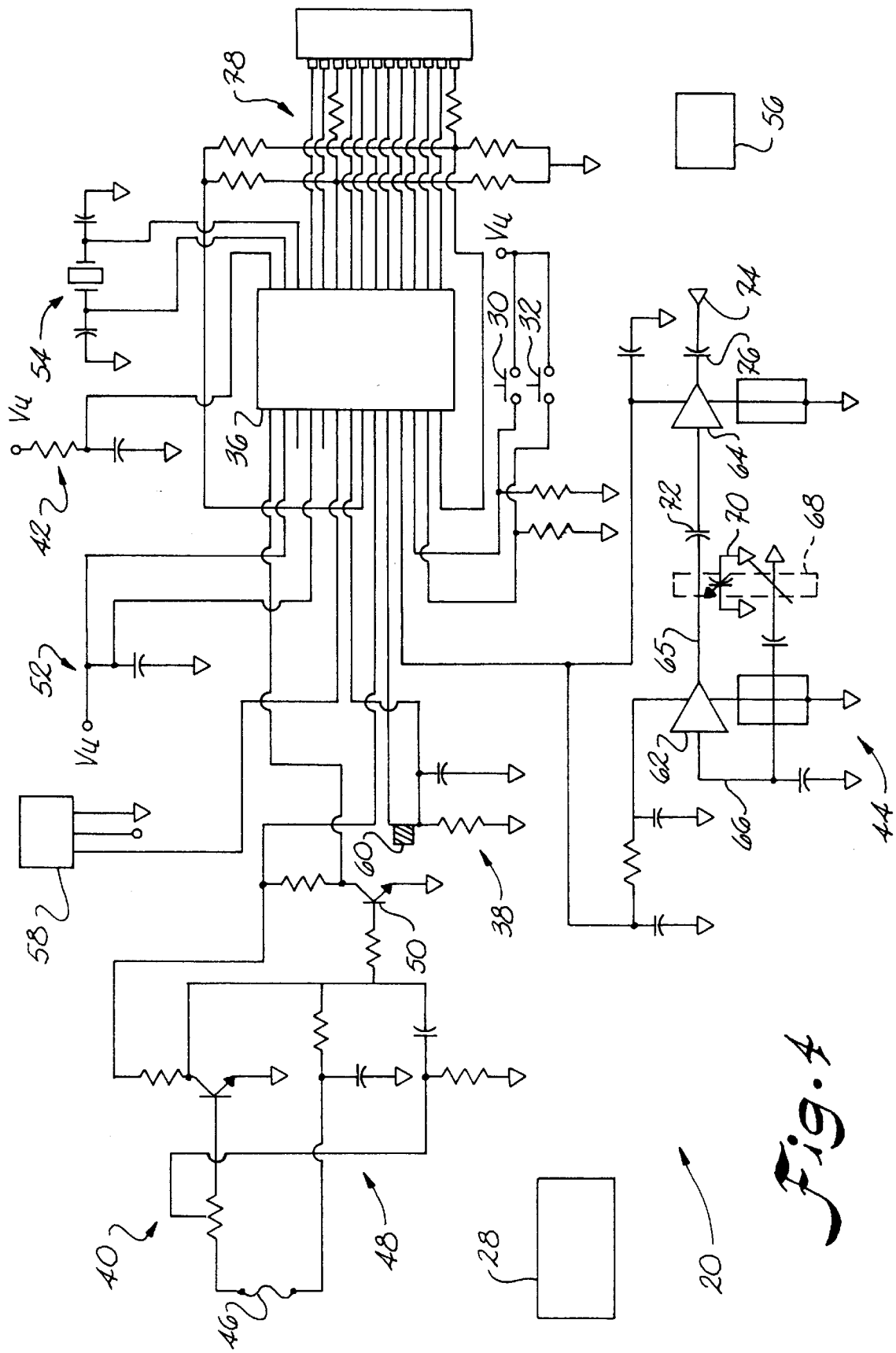
FIG. 4 is a schematic illustration of a thermostat assembly constructed in accordance with the present invention.

FIG. 4 is a schematic illustration of an exemplary embodiment of transmitter 20. Those of ordinary skill in this art should understand, however, that various suitable constructions and configurations of transmitter 20 are encompassed by the present invention, including various suitable analog or digital circuitry configurations. Thus, the particular construction illustrated in FIG. 4, and the particular construction of receiver 18 illustrated in FIGS. 5A and SB, are not presented by way of limitation of the present invention.

Referring now to FIG. 4, temperature sensing mechanism 40 includes thermistor 46 connected to twin-T oscillator 48. Twin-T oscillator 48 oscillates at a frequency which depends upon the resistance of thermistor 46. The resistance of thermistor 46 varies predictably with temperature. Accordingly, ambient temperature may be measured by determining the frequency of twin-T oscillator 48.

Controller 36 includes a microprocessor and a digital divider and receives the output signal from twin-T oscillator 48 via transistor 50, which amplifies the oscillator's output signal to a logic level such as TTL. Power is provided to controller 36 at 52. Low frequency crystal oscillator 54 drives the controller at a low frequency, 32.7 KHz, to reduce power consumption. Transmitter 40 employs three 1.5 volt batteries, indicated at 56, connected to the circuitry at battery clip 58.

In operation, the digital divider of controller 36 samples the output from oscillator 48 over a period of approximately 100 milliseconds to determine its frequency. As noted above, this frequency may be used to determine the ambient temperature since the frequency response of the thermistor is known.

The temperature response of the thermistor, however, provides a temperature/frequency curve that appears to be at least second order. To reduce measurement error, the temperature/frequency curve of the twin-T oscillator 48 is linearized. Controller 36 stores the linearized curve. Accordingly, the calculated temperature is an approximation. However, the actual curve used has been chosen such that the error is less than +/−0.5 degrees with the normal operating range of 40° F. to 90° F. and remains within one degree over the maximum display range of 32° F. to 99° F.

Controller 36 is programmed to calculate and display temperature in either centigrade or fahrenheit. Although any suitable programming system may be used, a preferred embodiment employs time linear coding. To avoid relatively complicated mathematical programming, the period at which oscillator 48 is sampled is varied depending on whether the frequency measurement is to be in degrees fahrenheit or degrees centigrade. That is, rather than first determining temperature in degrees fahrenheit and converting that number to centigrade, controller 36 adjusts the sampling period to account for the conversion. Thus, while the frequency of oscillator 48 is sampled over a period of approximately 100 milliseconds, the actual sampling period is slightly different to permit the use of integer math, and is slightly longer when the measurement is to be made in centigrade. The resulting frequency count is then divided by a small integer value and reduced by an appropriate offset. The result is the current ambient temperature in either fahrenheit or centigrade.

As noted above, controller 36 normally turns power off to the components of transmitter 20, waking up approximately 30 times per second to maintain power to LCD display 28 and to monitor input buttons 30 and 32. If controller 36 detects that either button has been activated, it "wakes" the circuit to perform the desired function. Approximately once per minute, however, controller 36 samples the output of oscillator 48. Since power is normally off, power must first be applied to the oscillator for approximately 50 milliseconds before the temperature reading is taken. Thus, the circuit will wake up for this extended period of time, approximately 150 milliseconds, when it becomes necessary to take a temperature reading.

The current ambient temperature is displayed at LCD display 28, which is driven by a drive circuit 78. If ambient temperature is being displayed, in either centigrade or fahrenheit, an "actual" indicator light on the LCD display is lit.

As discussed above, an operator may input a desired ambient temperature, referred to as the set point. The set point is input using buttons 30 and/or 32. Pressing either of the input buttons initially switches the display from the current ambient temperature to the current set point temperature and causes lighting of a "set temp" indicator light on display 28. Each of the input buttons 30 and 32 is assigned to be either an "up" or "down" button. Further depression of a button causes the set point to be raised or lowered, depending upon the button pressed. After the last button is pressed, display 28 will revert to the current ambient temperature within approximately 20 seconds.

"Setback" temperature is an alternate temperature setting that may be used, for example, as a desired night temperature. It may be set above or below the set point temperature. To determine whether the set point or the setback should be used, controller 36 monitors low light sensor 38. Low light sensor 38 includes a Darlington photocell 60. In a preferred embodiment, the low light sensor is activated at 7 lums. Accordingly, above 7 lums, controller 36 operates with the set point temperature, while below 7 lums the setback temperature is used. To establish or adjust the setback temperature, the operator covers photocell 60 and uses buttons 30 and 32 to adjust the setback temperature up or down as described above. If the room light is low, a setback indicator light is lit on display 28 to notify an operator that the setback temperature is being used.

An operator may toggle transmitter 20 between fahrenheit and centigrade by pressing both buttons 30 and 32 for more than five seconds. The current setting, either fahrenheit or centigrade, is always indicated on the display. The set point and setback temperatures are converted when the setting is changed. Changing from fahrenheit to centigrade and back again may lead to a difference in the set point or setback temperatures due to rounding in fahrenheit/centigrade conversion.

The setback function may be completely disabled by setting the setback value to zero degrees. The transmitter itself may be operatively disabled by setting the set point to zero degrees. A "training" mode, discussed below, may be activated by setting the set point temperature to 01° F.

In operation, controller 36 compares the ambient temperature with either the set point or the setback, depending upon the output of low light sensor 38, to determine whether an air conditioning request signal should be transmitted to receiver 18. Thus, in normal daytime operation, if the ambient temperature is below the set point, an air conditioning request signal is transmitted to the receiver to activate furnace 14 (FIG. 1) to provide heated air to the area served by the furnace. As long as the ambient temperature remains below the set point, the thermostat sends an air conditioning request signal approximately once per minute.

Preferably, however, controller 36 uses the current temperature in conjunction with the temperature change over the previous two sampling intervals to form a linear prediction of the temperature two minutes ahead. If the temperature is predicted to be above the set point, controller 36 will no longer send air conditioning request signals to receiver 18, even though the current temperature may still be below the set point. Thermal inertia then carries the ambient temperature to or beyond the set point. Of course, controller 36 may use a target temperature that is a predetermined value, or deadband, above the set point. That is, if the set point is set to 70° F., the furnace is activated if the ambient temperature drops below 70° F. but is not deactivated until the temperature rises, or is predicted to rise, above 72° F. This reduces overly frequent cycling of furnace 14.

Although the linear prediction function is preferably used to predict when the heater should be turned off, it may also be used to predict when ambient temperature will drop below the set point, or setback, so that the furnace may be turned on. It should also be understood that the three minute prediction period may be varied depending upon the air conditioning system used or the area served by the air conditioning system.

The air conditioning request signals are transmitted using an adapted Manchester Encoding by pulse modulating the transmitted RF carrier. The data transmitted is in NRZI form with a state transition always occurring at each clock cycle. The presence of a transition between clocks indicates a data value of 1, while its absence indicates a data value of 0. The air conditioning request signal transmission includes a string of 1's to condition and provide timing for the receiver 18, followed by a 0 as a start pulse and polarity indicator. This is followed by 16-bit serial number assigned to the particular transmitter 20.

Accordingly, the air conditioning request signal is comprised of the binary serial number for the transmitter 20 stored by controller 36. This serial number is preferably stored in controller 36 at the time of manufacture. It may, however, be programmed by the operator, for example through the use of dip switches directed to controller 36.

If multiple transmitters 20 are used relatively close together, signal interference may cause data collisions that could prevent a receiver 18 from activating its furnace 14 (FIG. 1) when necessary. To avoid this, the interval at which controller 36 samples the output of oscillator 48 is slightly varied from the one minute interval discussed above. The exact time is varied, typically increased, according to the low order bits of the transmitter's serial number. Since each transmitter has a unique serial number, each will have a unique sampling interval. Since the time at which air conditioning request signals are transmitted depends upon the time at which temperature measurements are made, each transmitter will transmit air conditioning request signals at different times.

Although the sampling intervals are different, two or more transmitters may, every so often, transmit air conditioning request signals at the same time. Their differing sampling intervals will, however, cause the following transmissions to occur at different times. This possible occasional data collision does not hinder effective operation of the air conditioning system.

The air conditioning request signals are transmitted via transmitter 44. Transmitter 44 is an RF transmitter including amplifiers 62 and 64 which, in one preferred embodiment, are MMIC amplifiers. Amplifier 62 operates as an oscillator through feedback from output 65 to input 66. A coupling is provided across ground plane 68 to establish a band pass filter having a center frequency determined by adjustable capacitor 70. The band pass is approximately 1 percent of carrier frequency. Output 65 of oscillator 62 is coupled to amplifier 64 through capacitor 72. Amplifier 64 is coupled to antenna 74 via capacitor 76.

FIG. 3 diagrammatically illustrates receiver 18 and relay 16. Receiver 18 receives electricity from power input 80, which will typically be the host building electrical system. A reset circuit 82 includes a master disconnect, or "rocker" switch, to activate or deactivate receiver 18. Reset circuit 82 also includes circuitry to convert the higher AC voltage from power source 80 to five volts DC as required by receiver components.

EEPROM memory 84 stores receiver data such as the serial number of the transmitter to which the receiver 18 is mated. Data is stored in memory 84 whether or not power is supplied to receiver 18.

Receiver 86 is an RF receiver tuned to the same frequency as the transmitter. Preferably, a 300 MHz band or 900 MHz band is used, although this may depend on particular circumstances such as local regulations. It receives air conditioning request signals and identification signals from the transmitter and outputs this information to the receiver controller.

Freeze protection circuitry 88 is used to measure ambient temperature around receiver 18. If this circuitry detects temperature at or below a predetermined minimum, usually slightly above freezing, receiver 18 activates furnace 14 (FIG. 1) to output heated air. Accordingly, if the transmitter is inoperative or absent, the area served by the air conditioning system is protected from freezing temperatures.

A learn switch 24 is used to mate receiver 18 with a transmitter. Its operation is discussed below.

A controller 92 is in communication with memory 84, receiver 86, freeze protection circuitry 88 and learn switch 24 to control operation of receiver 18. It receives air conditioning request signals from receiver 86 and activates relay 16 responsively to these signals. When an operator activates learn switch 24, controller 92 looks for an identifying signal from receiver 86 and, when such a signal is received, stores the appropriate serial number in memory 84. When in this "learn" mode, controller 92 activates LED output 22.

Figure 5A:
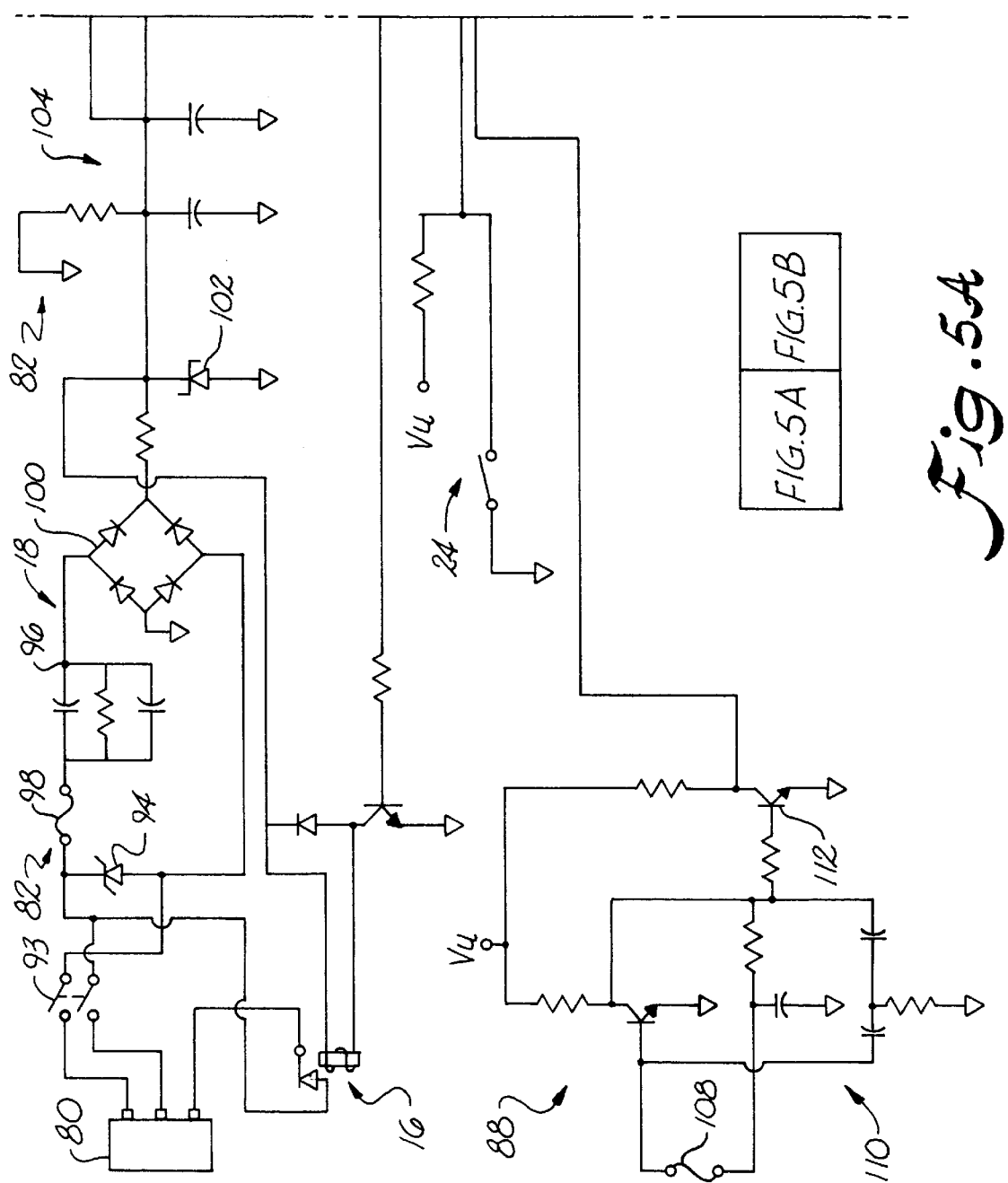
FIGS. 5A and 5B are a schematic illustration of an air conditioning control assembly constructed in accordance with the present invention.
Figure 5B:
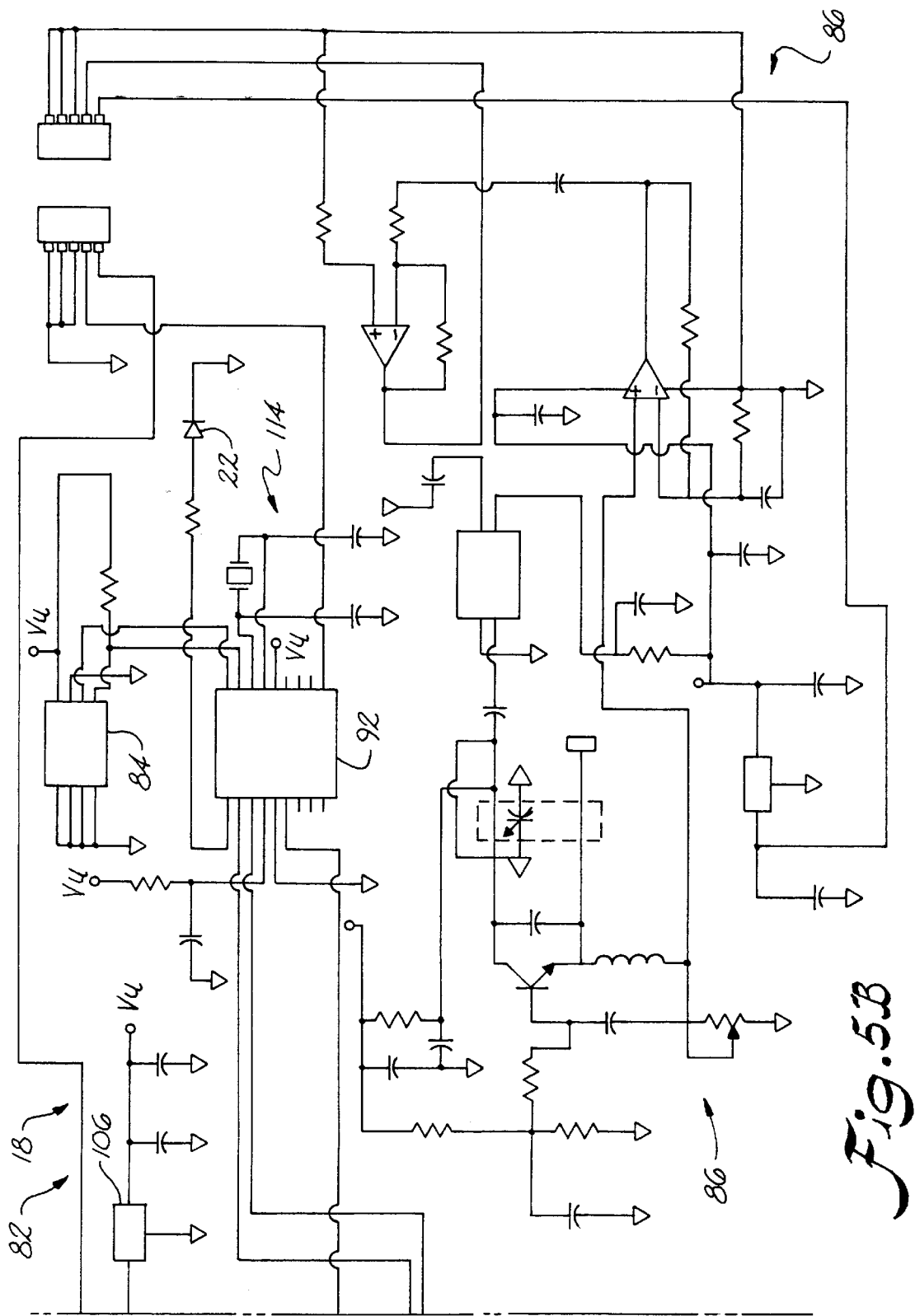

FIGS. 5A and 5B schematically illustrate receiver 18. Reset circuitry 82 includes rocker switch 93 connected to power input 80. Metal oxide varistor 94 clamps the input voltage at 270 volts for surge protection.

The AC input is capacitively coupled at 96 from fuse 98 to bridge circuit 100, which converts the input signal to DC. Zener diode 102 regulates the DC input to 24 volts. Filter circuit 104 provides low and high frequency ripple and bleeds the circuit down after it is turned off to avoid shock. Voltage regulator 106 converts 24 volts to the 5 volt $V_{cc}$ needed by other circuit components.

Freeze protection circuit 88 includes a thermistor 108 and a twin-T oscillator 110 with a transistor 112 to amplify the output from oscillator 110 to a logic level such as TTL. The operation of thermistor 108, oscillator 110 and transistor 112 is similar to that of thermistor 46, oscillator 48 and transistor 50 of transmitter 20 (FIG. 4).

When receiver 18 is inactive, that is, when it is not receiving or responding to air conditioning request signals or when it is not operating in learn mode, controller 92 samples the output from freeze protection circuitry 88 approximately once per minute. If it detects a temperature below the freeze target temperature, it activates relay 16 to activate furnace 14 (FIG. 1). Preferably, controller 92 activates the relay when temperature measured by freeze protection circuitry 88 falls below 40° F. A five degree deadband is used so that the controller will continue to activate the relay until it detects a temperature from freeze protection circuitry 88 above 45° F.

Controller 92 operates in conjunction with clock 114. Receiver 86 is a super regenerative receiver tuned to the same frequency as the transmitter. Controller 92 monitors the output from receiver 86, looking for the pulsed start signal from the transmitter. Once it detects this signal, the pulse width is measured to establish the data transmission base time. Controller 92 then looks for a start pulse, which is defined as a transition not occurring within one and one-half pulse times followed by a signal transition within less than one pulse time.

Once the start pulse has been verified, controller 92 begins a data receive cycle for sixteen data bits. For each data bit, a "0" value is defined as no signal transition within one and one-half pulse times from the previous clock transition and a clock transition within less than one pulse time following the data receive pulse timer expiration. A "1" value is defined as a signal transition occurring within one-half to one and one-half pulse times from the previous clock transition and a clock transition occurring within one-half to one and one-half pulse times following the data transition. Reception is successfully terminated once sixteen data bits have been received. Reception is aborted if a clock transition is not found within the expected time frame.

As discussed above, receiver 18 stores a serial number of the transmitter to which it is mated. Air conditioning request signals from the transmitter include this serial number. Accordingly, once a receive cycle is successfully completed, controller 92 compares the 16-bit serial number in the air conditioning request signal to the serial number stored by receiver 18. If the numbers match, the transmission is considered to be a valid air conditioning request. If receiver 18 is not in a hold-off mode (discussed below), controller 92 activates, or continues to activate, relay 16.

Controller 92 operates a three-minute air conditioning request timer and a three-minute hold-off timer to prevent heater run-away and excessive heater power cycling. When controller 92 receives an air conditioning request signal at a time when it is not activating the heater, it will activate relay 16 and initialize an internal three-minute timer. If it receives additional air conditioning request signals from the transmitter before this timer expires, it resets the timer. If it fails to receive an air conditioning request signal before the timer expires, it releases relay 16 to turn the furnace off.

The three-minute heat request timer assures that the furnace will be activated for not less than three minutes and prevents accidental heater runaway possible if a positive shut-off signal were required but, for some reason, were not received. The minimum three-minute on-time following any air conditioning request signal is a factor that is accounted for in determining the two-minute heat anticipation prediction period discussed above.

When the relay 16 is deactivated by controller 92, the controller initializes a three-minute hold-off period. During this time, controller 92 will not reactivate relay 16, even if instructed to do so by an air conditioning request signal. The hold-off time, in combination with the three-minute air conditioning request timer, prevents excessive heater power cycling.

Transmitter 20 (FIG. 4) and receiver 18 are configured to automatically mate with one another. Referring again to FIG. 4, setting the set point temperature of transmitter 20 using buttons 30 and 32 as described above puts transmitter 20 into "training" mode. In training mode, transmitter 20 does not monitor ambient temperature. Controller 36 transmits signals via transmitter 44 to identify transmitter 20. These identifying signals comprise an air conditioning request signal as described above with an extra bit so that the receiver can distinguish them as identifying signals and so that the receiver will not mistake the signals for air conditioning request signals and inappropriately activate the furnace.

Transmitter 20 transmits the identifying signals approximately once per minute for as long as the unit is in the training mode.

Referring again to FIGS. 5A and 5B, receiver 18 receives the identifying signals by super regenerative receiver 86 but will ignore them unless set to the "learn" mode. Learn switch 24 is a momentary contact switch connected to controller 92 which enables the learn mode. When in the learn mode, controller 92 looks for an identifying signal from the transmitter in the format described above. When one is received, the corresponding serial number is stored in memory 84. Thereafter, only air conditioning request signals including this serial number will be acted upon by the receiver.

The receiver does not remain in learn mode indefinitely. If it does not receive an identifying signal within four minutes, it returns to normal operation. The successful reception of an identifying signal is indicated by LED 22. During normal operation, indicator 22 is lit whenever relay 16 is activated, thereby indicating when the furnace is activated. It will also blink for one-half second when a valid air conditioning request signal is received. When the receiver is placed in learn mode, however, the indicator will repeatedly blink at a rate of two flashes per second until an identifying signal is successfully received. Once this signal is received, the indicator ceases the repetitive blinking but will blink for one-half second as subsequent identifying signals are received by the transmitter. This continues until either the transmitter is removed from training mode or the receiver ends its learn mode.

In operation, transmitter 20 (FIG. 4) periodically samples the frequency of the twin-T oscillator to determine ambient temperature. The sampling interval is approximately one minute but varies as described above depending upon the transmitter's serial number stored by the controller's memory (the controller reads this serial number and sets the sampling interval accordingly). The controller also reads the set point temperature, or the setback temperature if the unit is in setback mode, and compares this temperature with the measured ambient temperature. If the ambient temperature is less than the set point, or setback, temperature, the controller transmits via the RF transmitter an air conditioning request signal to receiver 18 (FIGS. 5A and 5B) to activate furnace 14 (FIG. 1).

The transmitter continues to periodically sample the ambient temperature and send air conditioning request signals until any of a number of events occurs. If an operator adjusts the set point or the setback temperatures using buttons 30 and/or 32 (FIG. 4), the transmitter interrupts the temperature sampling cycle, stores the new temperature information when the operator releases the button, and then resumes the temperature sampling cycle using the new set point or setback numbers.

If the operator sets the setback temperature to 00, the setback function is disabled, and the transmitter will operate using the set point temperature regardless of the light level detected by the low light sensor. If an operator sets the set point to 00, the transmitter is completely disabled. If the operator sets the set point to 01° F., the transmitter goes into training mode, ending the temperature sampling cycle, and transmits identifying signals approximately once per minute.

If no button is pressed, the transmitter continues to periodically measure temperature and send air conditioning request signals until the ambient temperature rises above the set point. A deadband may be introduced of, for example, 3° F. to 5° F. so that the transmitter will continue to transmit air conditioning request signals until it detects an ambient temperature equal to the set point plus the deadband. At this point, transmission of air conditioning request signals stops, and the transmitter continues to periodically measure the temperature.

Preferably, the transmitter controller conducts a heat anticipation algorithm, remembering the temperature change from the last two temperature measurements and making a linear prediction of the ambient temperature two minutes ahead. When this predicted temperature rises above the set point, or the set point plus the deadband, the transmitter stops sending air conditioning request signals.

The receiver receives the air conditioning request signals and operates the furnace responsively thereto. If the receiver is set to learn mode, however, it looks for identifying signals from the transmitter and does not operate the furnace. Once an identifying signal is successfully received, the serial number of the transmitter is stored, and the receiver will thereafter will respond only to air conditioning request signals having that serial number. Preferably, the receiver includes an on-cycle timer and an off-cycle timer to maintain minimum three-minute hold-on and hold-off times. The receiver also preferably includes a freeze protection circuit which detects ambient temperature about the receiver, permitting the receiver to operate the furnace should temperatures drop near freezing.

Throughout its operation, the transmitter enters a "sleep" mode, intermittently reducing or shutting off power to circuit components in order to reduce power consumption. Sleep mode is controlled by the transmitter controller, which "wakes" the circuit up approximately 30 times per second to provide power to the LCD display and to check the state of the input buttons. The sleep mode cycle will be interrupted if a button is pressed or if it is necessary to sample the frequency of the twin-T oscillator to determine the ambient temperature. At these times, current draw from the batteries remains at its operational level.

While preferred embodiments of the invention have been described above, it is to be understood that any and all equivalent realizations of the present invention are included within the scope and spirit thereof. For example, certain features of some embodiments may be omitted from other embodiments or may be combined with features of those embodiments to achieve a still further embodiment. Furthermore, it should be understood by those of ordinary skill in this art that the present invention may be realized by various suitable circuitry configurations. Thus, the embodiments depicted are presented by way of example only and are not intended as limitations upon the present invention. That is, while particular embodiments of the invention have been described and shown, it will be understood by those of ordinary skill in this art that the present invention is not limited thereto since many modifications can be made. Therefore, it is contemplated that any and all such embodiments are included in the present invention as may fall in the literal or equivalent scope of the appended claims.

What is claimed is:

1. A wireless air conditioning control system, said system comprising:

a thermostat assembly configured to measure ambient temperature in an area to which an air conditioning system provides conditioned air, to compare measured ambient temperature with a predetermined target temperature, to wirelessly transmit identification signals, and to wirelessly transmit air conditioning request signals responsively to the comparison between said measured temperature and said target temperature, said air conditioning request signals and said identifying signals corresponding to a particular said thermostat assembly for use in a said area; and an air conditioning control assembly configured to receive said air conditioning request signals and to control operation of said air conditioning system responsively to said air conditioning request signals, said air conditioning control assembly also being configured in a learn mode of operation to receive a said identifying signal to identify a said thermostat assembly and to thereafter, in an operational mode of operation, control operation of said air conditioning system responsively to said air conditioning request signals received only from said thermostat assembly identified by said identifying signal received during said learn mode.

2. The wireless air conditioning control system as in claim 1, wherein said air conditioning request signal and said identifying signal each include a serial number corresponding to the said thermostat assembly that transmits said identifying signal and said air conditioning request signal.

3. The wireless air conditioning control system as in claim 1, wherein said thermostat assembly is further configured to transmit a said identifying signal in response to a predetermined command by an operator.

4. The wireless air conditioning control system as in claim 1, wherein said thermostat assembly is configured to compare said measured temperature with said target temperature and to transmit a said air conditioning request signal when said measured temperature is below said target temperature, and wherein said control assembly is configured to control, upon receipt of a said air conditioning request signal, a said air conditioning system to provide heated air to said area.

5. The wireless air conditioning control system as in claim 1, wherein said thermostat assembly comprises a portable unit contained within a housing, and wherein said thermostat assembly includes at least one battery providing electricity to said thermostat assembly.

6. A wireless air conditioning control system, said system comprising:

a thermostat assembly including a temperature sensing mechanism configured to measure ambient temperature in an area, a transmitting mechanism configured to wirelessly transmit signals from said thermostat assembly, and a first control mechanism in operative communication with said temperature sensing mechanism and said transmitting mechanism, said first control mechanism configured to compare the ambient temperature measured by said temperature sensing mechanism with a predetermined target temperature, to transmit identifying signals via said transmitting mechanism, and to transmit air conditioning request signals via said transmitting mechanism responsively to the comparison between said measured temperature and said target temperature, said identifying signals and said air conditioning request signals corresponding to a particular said thermostat assembly for use in a said area;

an air conditioning system in communication with said area and configured to provide conditioned air to said area; and an air conditioning control assembly including a receiver mechanism configured to receive said identifying signals and said air conditioning request signals from said thermostat assembly and a second control mechanism in operative communication with said receiver mechanism and said air conditioning system and configured to control operation of said air conditioning system responsively to said air conditioning request signals, said second control mechanism being configured in a learn mode of operation to identify a said thermostat assembly in response to a said identification signal received by said receiver mechanism from said thermostat assembly and to thereafter, in an operational mode of operation, control operation of said air conditioning system responsively to said air conditioning request signals received only from said thermostat assembly identified by said identifying signal received during said learn mode.

7. The wireless air conditioning control system as in claim 6, wherein said temperature sensing mechanism includes a thermistor device.

8. The wireless air conditioning control system as in claim 6, wherein said identifying signals and said air conditioning request signals each include a serial number corresponding to the said thermostat assembly that transmits said identifying signals and said air conditioning request signals and wherein said second control mechanism is configured in said learn mode to identify a said thermostat assembly in response to a said identifying signal received by said receiver mechanism and to thereafter, in said operational mode, control operation of said air conditioning system responsively to said air conditioning request signals received only from said thermostat assembly identified by said identifying signal received during said learn mode.

9. The wireless air conditioning control system as in claim 8, wherein said serial number is a binary coded number.

10. The wireless air conditioning control system as in claim 6, wherein said thermostat assembly includes an input mechanism in operative communication with said first control mechanism whereby said target temperature is input by an operator to said first control mechanism via said input mechanism, said first control mechanism being further configured to transmit a said identifying signal in response to a command input by an operator via said input mechanism.

11. The wireless air conditioning control system as in claim 10, wherein said first control mechanism is configured to periodically transmit, via said transmitting mechanism, said identifying signals upon receipt of said command.

12. The wireless air conditioning control system as in claim 10, wherein said command includes setting said target temperature to a predetermined value.

13. The wireless air conditioning control system as in claim 6, wherein said control assembly includes an input mechanism in operative communication with said second control mechanism and wherein said learn mode is initiated by a command from an operator to said second control mechanism via said input mechanism.

14. The wireless air conditioning control system as in claim 6, wherein said thermostat assembly includes a light sensing mechanism in operative communication with said first control mechanism and wherein said first control mechanism is configured to compare said measured temperature with a second predetermined target temperature when said light sensing mechanism detects a predetermined light level and to transmit said air conditioning request signals responsively to the comparison between said measured temperature and said second predetermined target temperature.

15. A wireless air conditioning control system, said system comprising:

a thermostat assembly including
  a temperature sensing mechanism configured to measure ambient temperature in an area,
  a first input mechanism,
  a transmitting mechanism configured to wirelessly transmit signals from said thermostat assembly, and
  a first control mechanism in operative communication with said first input mechanism and said temperature sensing mechanism, said first control mechanism being configured to compare the ambient temperature measured by said temperature sensing mechanism with a target temperature input to said first control mechanism by a user via said input mechanism, to transmit air conditioning request signals via said transmitting mechanism responsively to the comparison between said measured temperature and said target temperature, and to transmit identifying signals via said transmitting mechanism, said air conditioning request signals and said identifying signals corresponding to a particular said thermostat assembly for use in a said area, said first control mechanism being further configured to transmit a said air identifying signal via said transmitting mechanism in response to a predetermined command input by an operator via said input mechanism;

an air conditioning system in operative communication with said area and configured to provide conditioned air to said area; and an air conditioning control assembly including
- a receiver mechanism configured to receive said identifying signals and said air conditioning request signals from said thermostat assembly,
- a second input mechanism, and
- a second control mechanism in operative communication with said receiver mechanism and said second input mechanism and configured to control operation of said air conditioning system responsively to said air conditioning request signals, said second control mechanism being configured, in a learn mode of operation initiated by a command received by a user via said second input mechanism, to identify a said thermostat assembly by a said identifying signal received by said receiver mechanism and to thereafter, in an operational mode of operation, control operation of said air conditioning system responsively to said air conditioning request signals received only from said thermostat assembly identified by said identifying signal received during said learn mode.

16. The wireless air conditioning control system as in claim 15, wherein said identifying signals and said air conditioning request signals each include a binary coded serial number corresponding to the said thermostat assembly that transmits said identifying signals and said air conditioning request signals.

17. A wireless air conditioning control system, said system comprising:
- a thermostat assembly, said thermostat assembly configured to measure ambient temperature in an area to which an air conditioning system provides conditioned air, to compare measured ambient temperature with a predetermined target temperature, and to intermittently wirelessly transmit air conditioning request signals responsively to the comparison between said measured temperature and said target temperature, wherein transmissions by said thermostat assembly are staggered with respect to transmissions of air conditioning request signals from other said thermostat assemblies to avoid data collision during said transmissions; and
- at least one air conditioning control assembly configured to receive said air conditioning request signals from said thermostat assembly and to control operation of said air conditioning system responsively to said received air conditioning request signals.

18. The wireless air conditioning control system as in claim 17, including a plurality of said thermostat assemblies and wherein each said thermostat assembly is configured to store a serial number unique to said thermostat assembly among said plurality of thermostat assemblies and to intermittently transmit said air conditioning request signals, the interval between said intermittent transmissions being dependent upon said serial number.

19. A wireless air conditioning control system, said system comprising:
- a plurality of thermostat assemblies, each said thermostat assembly including
  - a temperature sensing mechanism configured to measure ambient temperature in an area,
  - a transmitting mechanism configured to wirelessly transmit signals from said thermostat assembly, and
  - a first control mechanism in operative communication with said temperature sensing mechanism and said transmitting mechanism, said first control mechanism configured to compare the ambient temperature measured by said temperature sensing mechanism with a predetermined target temperature and to periodically transmit air conditioning request signals via said transmitting mechanism responsively to the comparison between said measured temperature and said target temperature, wherein said first control mechanism is configured to store a serial number unique to its said thermostat assembly among said plurality of thermostat assemblies and wherein the length of the periodic interval of said transmissions is dependent upon said serial number;
- an air conditioning system configured to provide conditioned air to at least one said area; and
- an air conditioning control assembly, said air conditioning control assembly including
  - a receiver mechanism configured to receive signals wirelessly transmitted from a said thermostat assembly, and
  - a second control mechanism in operative communication with said receiver mechanism and said air conditioning system, said second control mechanism configured to control operation of said air conditioning system responsively to said air conditioning request signals.

20. A wireless air conditioning control system, said system comprising:
- a thermostat assembly configured to measure ambient temperature in an area to which an air conditioning system provides conditioned air, to compare measured ambient temperature with a predetermined target temperature, and to wirelessly transmit air conditioning request signals responsively to the comparison between said measured temperature lo and said target temperature, said air conditioning request signals corresponding to a particular said thermostat assembly for use in a said area; and
- an air conditioning control assembly configured to receive said air conditioning request signals and to control operation of said air conditioning system responsively to said air conditioning request signals, said air conditioning control assembly also being configured to measure ambient temperature about said air conditioning control assembly, to compare the measured ambient temperature about said air conditioning control assembly with a predetermined minimum desired temperature, and to control operation of said air conditioning system, regardless of said air conditioning request signals, to provide heated air to said area responsively to the comparison with said predetermined minimum desired temperature.

21. A wireless air conditioning control system, said system comprising:
- a thermostat assembly, said thermostat assembly including
  - a first temperature sensing mechanism configured to measure ambient temperature in an area,
  - a transmitting mechanism configured to wirelessly transmit signals from said thermostat assembly, and
  - a first control mechanism in operative communication with said first temperature sensing mechanism and said transmitting mechanism, said first control mechanism configured to compare the ambient temperature measured by said first temperature sensing mechanism with a predetermined target temperature and to transmit air conditioning request signals via said transmitting mechanism responsively to the comparison between said measured temperature and said target temperature;

an air conditioning system in communication with said area and configured to provide conditioned air to said area; and an air conditioning control assembly, said air conditioning control assembly including
- a second temperature sensing mechanism configured to measure ambient temperature about said air conditioning control assembly,
- a receiver mechanism configured to receive said air conditioning request signals, and
- a second control mechanism in operative communication with said receiver mechanism, said second temperature sensing mechanism and said air conditioning system, said second control mechanism being configured to control operation of said air conditioning system responsively to said air conditioning request signals, to compare the ambient temperature measured by said second temperature sensing mechanism with a predetermined minimum desired temperature, and to control operation of said air conditioning system, regardless of said air conditioning request signals, to provide heated air to said area responsively to the comparison with said predetermined minimum desired temperature.

22. The wireless air conditioning control system as in claim 21, wherein said thermostat assembly includes an input mechanism in operative communication with said first control mechanism whereby said target temperature is input by an operator to said first control mechanism via said input mechanism and wherein said first control mechanism is configured to intermittently reduce electric current drawn from said electricity source to said thermostat assembly during a period of time while said temperature sensing mechanism, said transmitting mechanism, and said input mechanism are inactive.

23. A wireless air conditioning control system, said system comprising:
- a thermostat assembly configured to measure ambient temperature in an area to which an air conditioning system provides conditioned air, to compare measured ambient temperature with a predetermined target temperature, and to wirelessly transmit air conditioning request signals responsively to the comparison between said measured temperature and said target temperature; and
- an air conditioning control assembly configured to receive said air conditioning request signals and to control operation of said air conditioning system responsively to said air conditioning request signals so that conditioned air is supplied to said area when said measured temperature differs from said target temperature by more than a predetermined amount,
- wherein said thermostat assembly is also configured
  - to store ambient temperature data corresponding to said measurements made over a predetermined period of time prior to the most recent said measurement,
  - to predict ambient temperature at a predetermined time following said most recent measurement based on said stored ambient temperature data, and
  - to control transmission of said air conditioning request signals to said air conditioning control assembly when said predicted ambient temperature equals or is beyond said target temperature with respect to said most recent measurement so that supply of said conditioned air to said area is ceased.

24. A wireless air conditioning control system, said system comprising:

- a thermostat assembly, said thermostat assembly including
  - a temperature sensing mechanism configured to measure ambient temperature in an area,
  - a transmitting mechanism configured to wirelessly transmit signals from said thermostat assembly, and
  - a first control mechanism in operative communication with said temperature sensing mechanism and said transmitting mechanism, said first control mechanism configured to periodically measure said ambient temperature via said temperature sensing mechanism, to compare measured ambient temperature with a predetermined target temperature and to transmit air conditioning request signals via said transmitting mechanism responsively to the comparison between said measured temperature and said target temperature;
- an air conditioning system in communication with said area and configured to provide conditioned air to said area; and
- an air conditioning control assembly, said air conditioning control assembly including
  - a receiver mechanism configured to receive said air conditioning request signals, and
  - a second control mechanism in operative communication with said receiver mechanism and said air conditioning system, said second control mechanism configured to control operation of said air conditioning system responsively to said air conditioning request signals so that said air conditioning system supplies conditioned air to said area when said measured temperature differs from said target temperature by more than a predetermined amount,
- wherein said first control mechanism is configured
  - to store ambient temperature data corresponding to a predetermined number of said periodic measurements made prior to the most recent measurement,
  - to predict ambient temperature at a predetermined time following said most recent measurement based on said stored ambient temperature data, and
  - to control transmission of said air conditioning request signals to said air conditioning control assembly when said predicted ambient temperature equals or is beyond said target temperature with respect to said most recent measurement so that said air conditioning system ceases supplying said conditioned air to said area.

25. A wireless air conditioning control system as in claim 24, wherein the length of said predetermined time is equal to the period of said periodic measurements.

26. A wireless air conditioning control system, said system comprising:
- a source of electricity;
- a thermostat assembly, said thermostat assembly powered by said electricity source and including
  - a first temperature sensing mechanism configured to measure ambient temperature in an area,
  - a first input mechanism,
  - a transmitting mechanism configured to wirelessly transmit signals from said thermostat assembly, and
  - a first control mechanism in operative communication with said first input mechanism and said first temperature sensing mechanism, said first control mechanism being configured to compare the ambient temperature measured by said first temperature sensing mechanism with a target temperature input to said first control mechanism by a user via said input mechanism, to intermittently transmit air conditioning request signals via said transmitting mechanism responsively to the comparison between said measured temperature and said target temperature, to transmit identifying signals via said transmitting mechanism, and to intermittently reduce electric current drawn from said electricity source to said thermostat assembly, wherein said air conditioning request signals and said identifying signals correspond to a particular said thermostat assembly for use in a said area, said first control mechanism is further configured to transmit a said air identifying signal via said transmitting mechanism in response to a predetermined command input by an operator via said input mechanism, said intermittent transmissions by said first control mechanism are staggered with respect to transmissions of air conditioning request signals from other said thermostat assemblies to avoid data collision during said transmissions, and said first control mechanism is further configured to store ambient temperature data corresponding to said measurements made over a predetermined period of time prior to the most recent said measurement, to predict ambient temperature at a predetermined time following said most recent measurement based on said stored ambient temperature data, and to transmit said air conditioning request signals responsively to said prediction;

an air conditioning system in communication with said area and configured to provide conditioned air to said area; and an air conditioning control assembly including
a second temperature sensing mechanism configured to measure ambient temperature about said air conditioning control assembly;
a receiver mechanism configured to receive said identifying signals and said air conditioning request signals from said thermostat assembly,
a second input mechanism, and
a second control mechanism in operative communication with said receiver mechanism and said second temperature sensing mechanism, said second control mechanism being configured to control operation of said air conditioning system responsively to said air conditioning request signals, said second control mechanism being configured, in a learn mode of operation initiated by a command received by a user via said second input mechanism, to identify a said thermostat assembly by a said identifying signal received by said receiver mechanism and to thereafter, in an operational mode of operation, control operation of said air conditioning system responsively to said air conditioning request signals received only from said thermostat assembly identified by said identifying signal received during said learn mode, said second control mechanism also being configured in said operational mode to compare the ambient temperature measured by said second temperature sensing mechanism with a predetermined minimum desired temperature and to control operation of said air conditioning system, regardless of said air conditioning request signals, to provide heated air to said area responsively to the comparison with said predetermined minimum desired temperature.

27. A wireless air conditioning control system, said system comprising:

means for measuring ambient temperature in an area to which an air conditioning system provides conditioned air, for comparing measured ambient temperature with a predetermined target temperature, for wirelessly transmitting identification signals, and for wirelessly transmitting air conditioning request signals responsively to the comparison between said measured temperature and said target temperature, said air conditioning request signals and said identifying signals corresponding to a particular said measuring means for use in a said area; and means for receiving said air conditioning request signals, for controlling operation of said air conditioning system responsively to said air conditioning request signals, for receiving, in a learn made of operation, a said identifying signal to identify a said measuring means, and for thereafter, in an operational made of operation, controlling operation of said air conditioning system responsively to said air conditioning request signals received only from said measuring means identified by said identifying signal received during said learn made.

* * * * *

UNITED STATES PATENT AND TRADEMARK OFFICE
CERTIFICATE OF CORRECTION

PATENT NO. : 5,927,599
DATED : July 27, 1999
INVENTOR(S) : Miles E.

BEST AVAILABLE COPY

It is certified that error appears in the above-indentified patent and that said Letters Patent is hereby corrected as shown below:

In Column 5, Line 41, please change 5E to -- 5B --

In Column 16, Line 32, please remove "10" between the words "temperature" and "and"
In Column 20, Line 38, please change the word "made" to -- mode --
In Column 20, Line 40, please change the word "made" to -- mode --
In Column 20, Line 45, please change the word "made" to -- mode --

Signed and Sealed this

Eighth Day of February, 2000

Attest:

Q. TODD DICKINSON

Attesting Officer

Commissioner of Patents and Trademarks